(12) United States Patent
Zhang et al.

(10) Patent No.: US 11,500,223 B2
(45) Date of Patent: Nov. 15, 2022

(54) LENS MODULE

(71) Applicant: AAC Optics Solutions Pte. Ltd., Singapore (SG)

(72) Inventors: Jin Zhang, Shenzhen (CN); Gang Li, Shenzhen (CN); Jiliang Lu, Shenzhen (CN); Linzhen Li, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 316 days.

(21) Appl. No.: 16/916,157

(22) Filed: Jun. 30, 2020

(65) Prior Publication Data
US 2020/0409169 A1    Dec. 31, 2020

Related U.S. Application Data

(63) Continuation of application No. PCT/CN2019/094062, filed on Jun. 30, 2019.

(51) Int. Cl.
| | | |
|---|---|---|
| *G02B 27/64* | (2006.01) | |
| *F03G 7/06* | (2006.01) | |
| *G02B 6/38* | (2006.01) | |
| *H01R 4/01* | (2006.01) | |

(52) U.S. Cl.
CPC ........... *G02B 27/646* (2013.01); *F03G 7/065* (2013.01); *G02B 6/3859* (2013.01); *H01R 4/01* (2013.01)

(58) Field of Classification Search
CPC .... G02B 27/646; G02B 7/023; G02B 6/3859; G02B 7/025; G02B 7/026; F03G 7/065; H01R 4/01
See application file for complete search history.

(56) References Cited

U.S. PATENT DOCUMENTS

2013/0002933 A1*  1/2013  Topliss ............... H04N 5/23287
                                                       310/306

\* cited by examiner

*Primary Examiner* — Joseph P Martinez
*Assistant Examiner* — Vipin Patel
(74) *Attorney, Agent, or Firm* — W&G Law Group (57) ABSTRACT

A lens module is disclosed. In the lens module, each group of shape memory alloy wires comprises two ends fixed to one of a base and a lens base, and a drive end located between the two ends, the other one of the base and the lens base is provided with a fixing member. The drive end is connected to the fixing member. The fixing member is provided with a flapper for preventing the drive end from escaping the fixing member. By adding a flapper to the fixing member, it may effectively prevent the shape memory alloy wires from escaping the fixing member. Besides, when one group of shape memory alloy wires operates, it does not result in extra stress to other groups of shape memory alloy wires, thereby prolonging service life of the shape memory alloy wires.

10 Claims, 8 Drawing Sheets

LENS MODULE

TECHNICAL FIELD

The present disclosure relates to the technical field of lens optical imaging, in particular to a lens module.

BACKGROUND

In recent years, a high-performance lens module is installed on portable terminals such as smart phones and tablet computers. Generally, the high-performance lens module has auto focusing (AF) and optical image stabilization (OIS) functions. The high-performance lens module needs to move a lens in the direction of an optical axis of the lens during auto-focusing, and needs to move the lens in a direction perpendicular to the direction of the optical axis of the lens when implementing the optical image stabilization function. In the existing technology, a shape memory alloy wire is used to drive a lens base to move in a direction perpendicular to the direction of the optical axis of the lens to realize image stabilization. A drive end of a shape memory alloy wire could come off during operation, thus the drive end is generally glued to strengthen fixing it, one defect of which, however, is that when one group of shape memory alloy wires drives the lens base to move in one direction, a great stress can be caused to other groups of shape memory alloy wires, especially to the group of shape memory alloy wires disposed in the opposite, to which the stress is greater, thereby reducing service life of the shape memory alloy wires.

Therefore, it is necessary to provide an improved lens module to solve the above problem.

SUMMARY

The present disclosure seeks to provide a lens module to solve the technical problem of avoiding greater stress when strengthening fixing a shape memory alloy wire.

The technical solution of the present disclosure is as follows: a lens module, including a base, a lens base, a holding assembly configured to hold the lens base, and several groups of shape memory alloy wires configured to drive the lens base to move in a direction perpendicular to a direction of an optical axis of a lens; the lens base being suspended within the base by the holding assembly; each group of the shape memory alloy wires including two ends fixed to one of the base and the lens base and a drive end located between the two ends, the other one of the base and the lens base being provided with a fixing member, the drive end being connected to the fixing member, and the fixing member being provided with a flapper configured to prevent the drive end from escaping the fixing member.

Further, the fixing member includes an attaching surface attaching to the drive end, and the flapper includes an installation section installed to the fixing member and a shielding section extending from the installation section and beyond the attaching surface.

Further, the installation section and the shielding section are integrally formed.

Further, an angle $\alpha$ is provided between the shielding section and the attaching surface, where $0°<\alpha\leq 90°$.

Further, the attaching surface is an arc surface.

Further, the flapper is a semicircle and has an arc side surface located at a side of a central axis of the fixing member, the side being away from the end. Alternatively, a part of the flapper located at the side of the central axis of the fixing member, the side being away from the end, is rectangular. The flapper has a long side surface located at the side of the central axis of the fixing member, the side being away from the end, and two short side surfaces respectively extending from two ends of the long side surface to the side where the end locates, the long side surface and the two short side surfaces being provided alternately. The length of the long side surface is defined as L and a distance between the two ends of a shape memory alloy wire is defined as D, where $L/D \geq 1/5$.

Further, either one of the fixing member and the installation section is provided with a clipping hole, the other one of the fixing member and the installation section is provided with a protruding pillar, and the flapper is installed to the fixing member by engaging the protruding pillar with the clipping hole.

Further, the protruding pillar is provided on the fixing member. A fixing surface of the protruding pillar, the fixing surface being away from the end, is set aligned with the attaching surface. The fixing member further includes a body, and the protruding pillar and the body are integrally formed.

Further, the end of the shape memory alloy wire is fixed to the base. The base includes a substrate and a frame fixed to the substrate, the substrate and the frame forming an accommodating space configured to accommodate the lens base. The frame is rectangular, and includes four side plates disposed circumferentially, the end of the shape memory alloy wires is fixed to one end of the side plate, the end facing the substrate. The fixing member is installed on the lens base, the body extends from the lens base towards the substrate, and the attaching surface is provided at a side of the body.

Further, two fixing grooves are provided at an end of each of the side plates, the end facing the substrate. The lens module further includes a plurality of conductive members, each conductive member is fixed in one respective fixing groove, and the two ends of each group of the shape memory alloy wires are respectively fixed to two of the conductive members of the same side plate. The base further includes a circuit board, and the circuit board is fixed to the substrate at the side facing the lens base. The conductive member is electrically connected with the circuit board, and there is a gap between the flapper and the circuit board.

The present disclosure is advantageous in: by adding a flapper to the fixing member, it may effectively prevent the shape memory alloy wires from escaping the fixing member, thereby strengthening fixing of the shape memory alloy wires in the direction of the optical axis; and when one group of shape memory alloy wires operates, it does not result in extra stress to other groups of shape memory alloy wires, thereby prolonging service life of the shape memory alloy wires.

Reference signs: 100, lens module; 1, base; 11, substrate; 12, frame; 121, side plate; 122, fixing groove; 2, lens base; 21, bottom; 22, lens holder; 3, holding assembly; 4, shape memory alloy wire; 41, end; 42, drive end; 5, fixing member; 51, body; 511, attaching surface; 52, protruding pillar; 521, fixing surface; 6, flapper; 61, installation section; 62, shielding section; 63, clipping hole; 64, arc side surface; 65, long side surface; 66, short side surface; 7, conductive member; 8, circuit board; 9, housing.

DETAILED DESCRIPTION

A further description is provided in the following for the present disclosure with reference to the drawings and embodiments.

Embodiment One

With reference to FIGS. 1-8, an embodiment of the present disclosure provides a lens module 100 including a base 1, a lens base 2, a holding assembly 3 configured to hold the lens base 2, and several groups of shape memory alloy wires 4 configured to drive the lens base 2 to move in a direction perpendicular to a direction of an optical axis of a lens. The lens base 2 is suspended within the base 1 by the holding assembly 3. Each group of the shape memory alloy wires 4 includes two ends 41 fixed to one of the base 1 and the lens base 2, and a drive end 42 located between the two ends 41. The other one of the base 1 and the lens base 2 is provided with a fixing member 5. The drive end 42 is connected to the fixing member 5. The fixing member 5 is provided with a flapper 6 configured to prevent the drive end 42 from escaping the fixing member 5. By fixing the two ends 41 of each group of the shape memory alloy wires 4 to either one of the base 1 and the lens base 2, and by fixing the drive end 42 through the fixing member 5 to the other one of the base 1 and the lens base 2, it may be realized that the lens base 2 moves in the direction perpendicular to the direction of the optical axis. By adding the flapper 6 to the fixing member 5, it may effectively prevent the shape memory alloy wires 4 from escaping the fixing member 5, thereby strengthening fixing the shape memory alloy wires 4 in the direction of the optical axis of the lens. The strengthening does not further fix the drive end 42 of the shape memory alloy wires 4. When one group of the shape memory alloy wires operates, it does not cause extra stress to other groups of the shape memory alloy wires 4, thereby prolonging service life of the shape memory alloy wires 4.

With reference to FIGS. 2-5, the base 1 includes a substrate 11 and a frame 12 fixed to the substrate 11. The substrate 11 and the frame 12 form an accommodating space configured to accommodate the lens base 2. The frame 12 is rectangular, and includes four side plates 121 disposed circumferentially. The end 41 of the shape memory alloy wires 4 is fixed to one end of the side plate 121, the end facing the substrate 11. Specifically, two fixing grooves 122 are provided at an end of each of the side plates 121, the end facing the substrate 11. The lens module 100 further includes a plurality of conductive members, each conductive member 7 is fixed in one respective fixing groove. The two ends 41 of each group of the shape memory alloy wires 4 are respectively fixed to two of the conductive members 7 of the same side plate 121.

Figure 2:
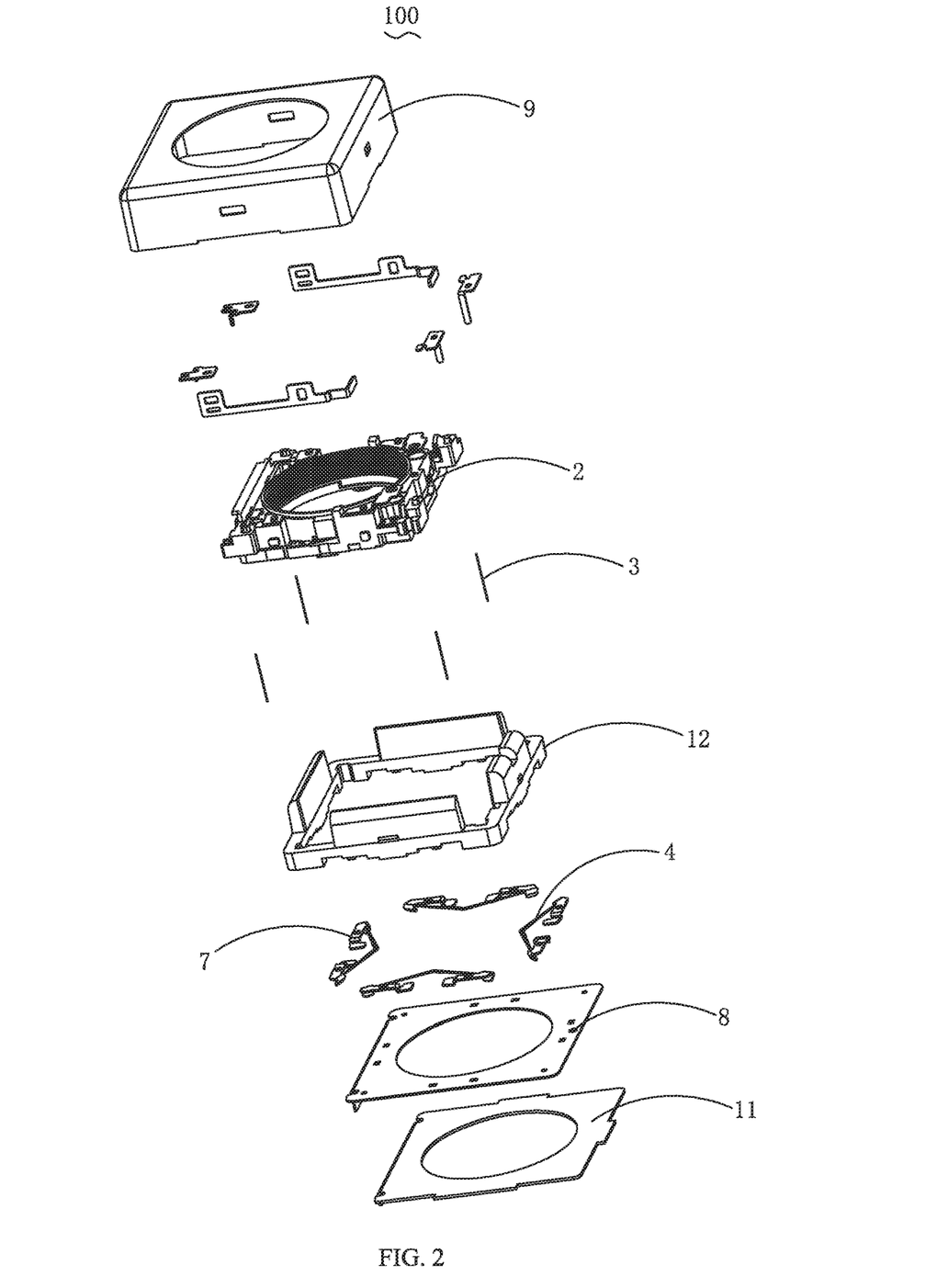
FIG. 2 is a schematic exploded structural view of the lens module according to Embodiment One of the present disclosure.
Figure 3:
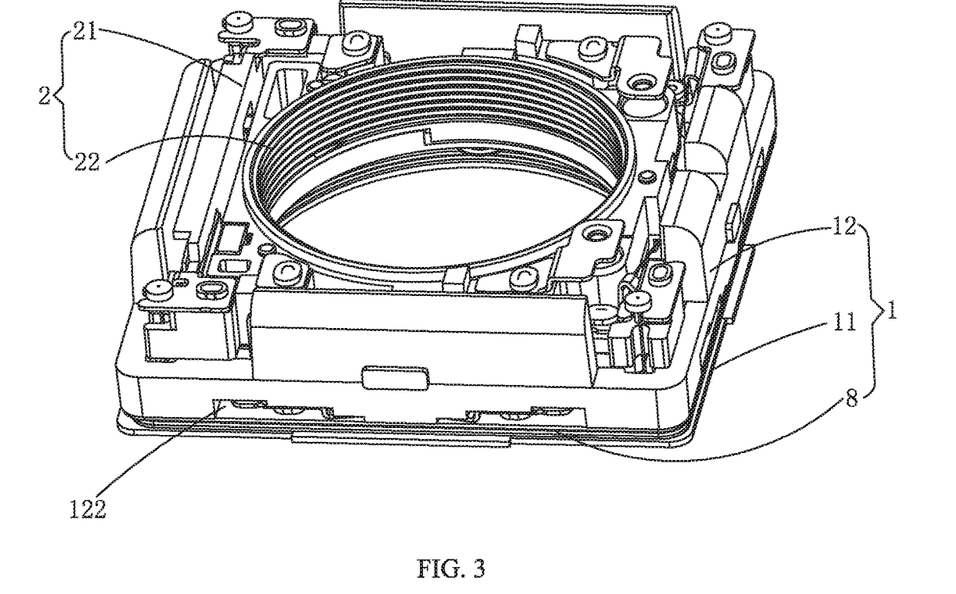
FIG. 3 is a schematic three-dimensional structural view of the lens module without a housing according to Embodiment One of the present disclosure.
Figure 4:
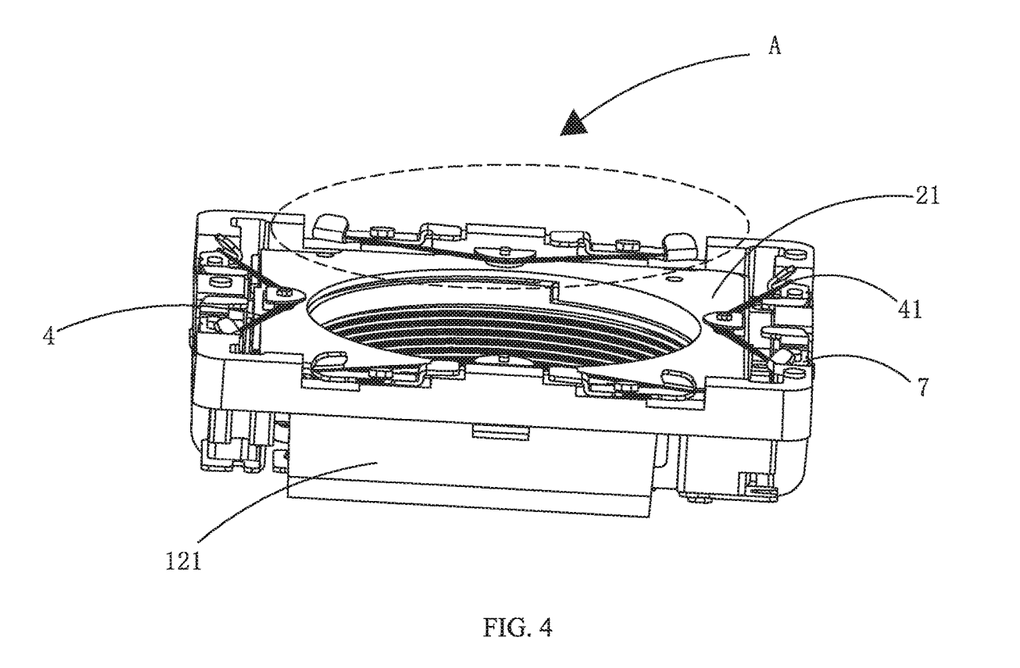
FIG. 4 is a schematic three-dimensional structural view of the lens module without a housing, a substrate or a circuit board according to Embodiment One of the present disclosure.
Figure 5:
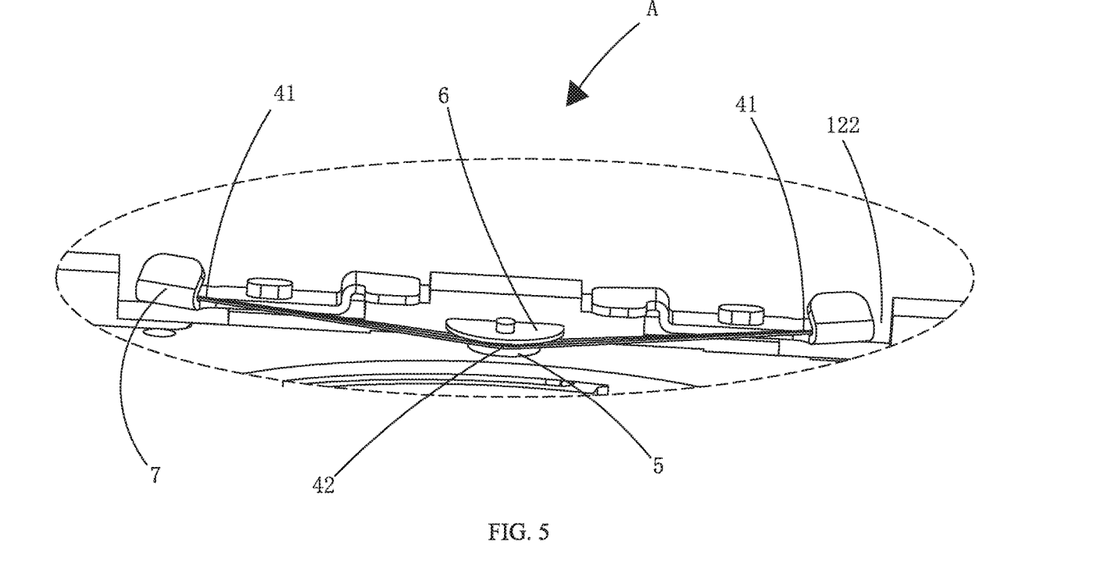
FIG. 5 is a schematic zoomed-in view of A in FIG. 4.
Figure 6:
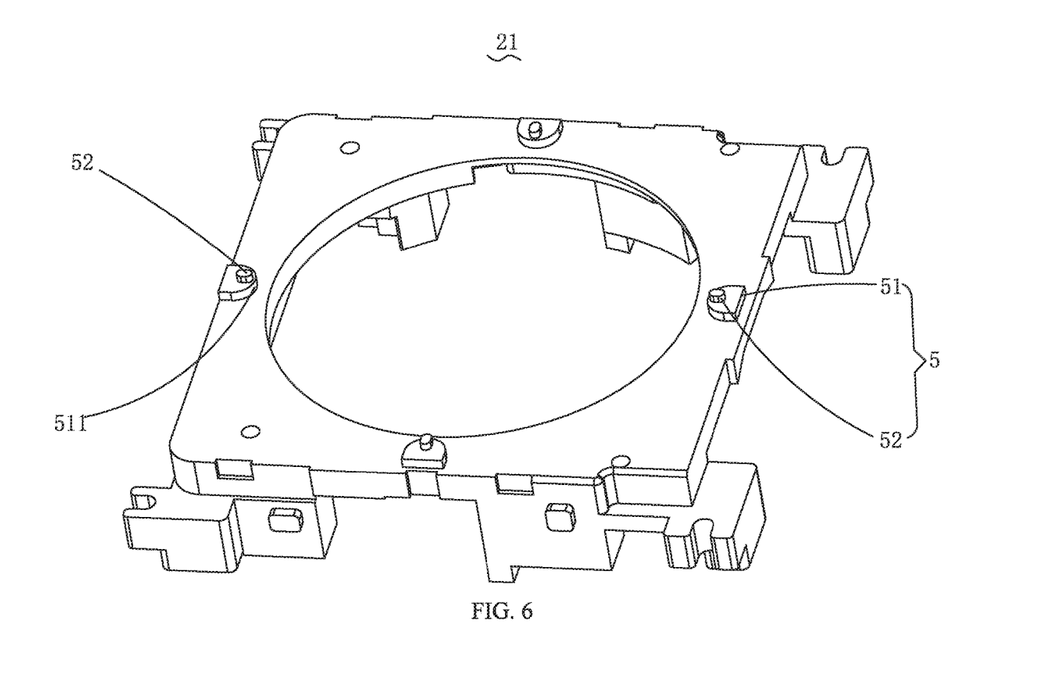
FIG. 6 is a schematic three-dimensional structural view of a bottom according to Embodiment One of the present disclosure.
Figure 7:
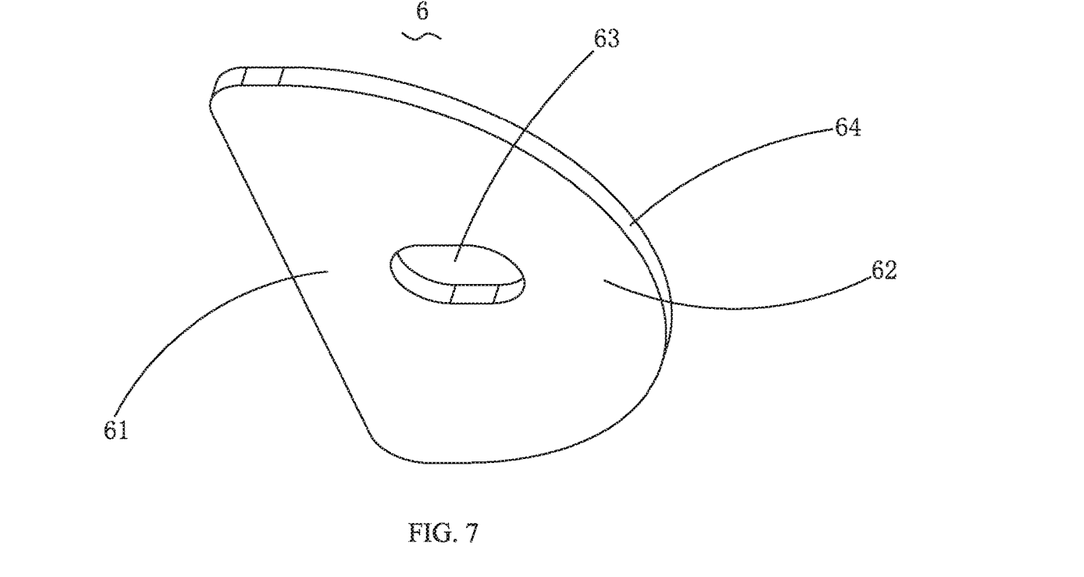
FIG. 7 is a schematic three-dimensional structural view of a flapper according to Embodiment One of the present disclosure.
Figure 8:
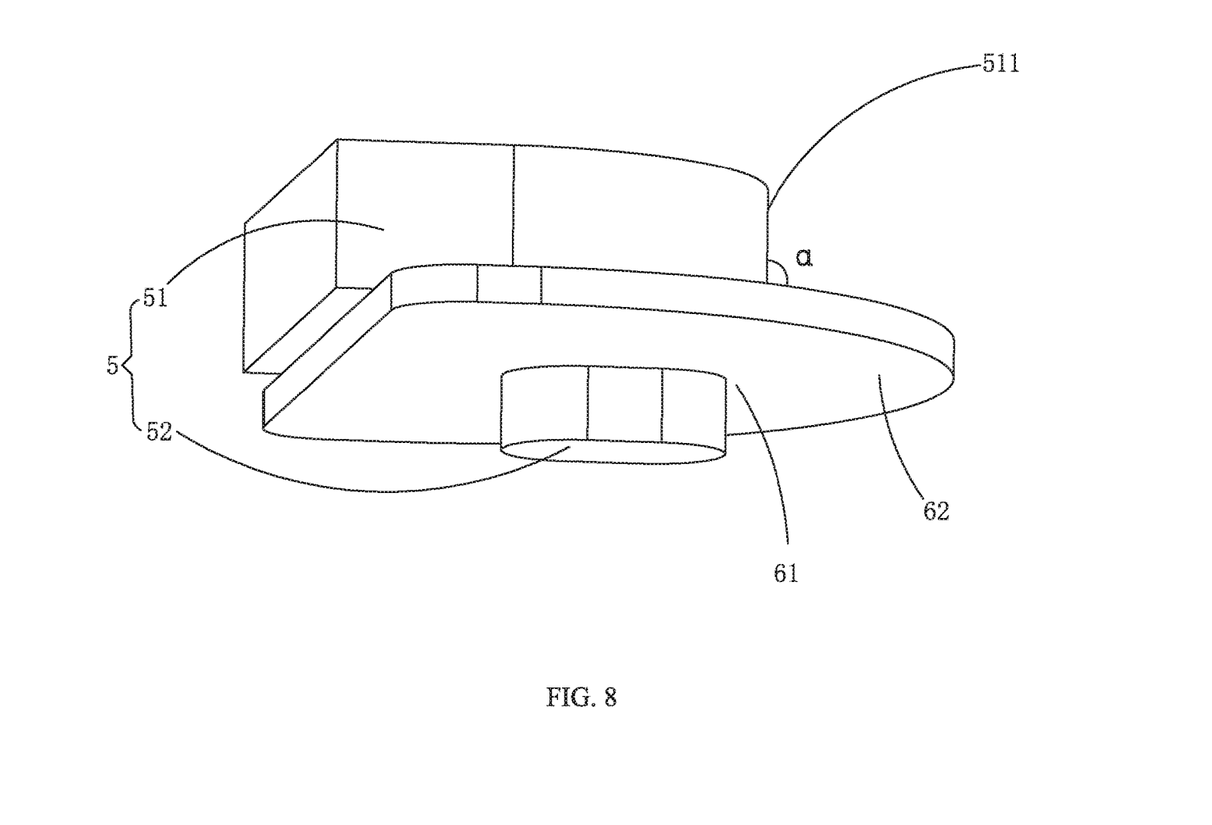
FIG. 8 is a schematic three-dimensional structural view showing the flapper and a fixing member match according to Embodiment One of the present disclosure.
Figure 9:
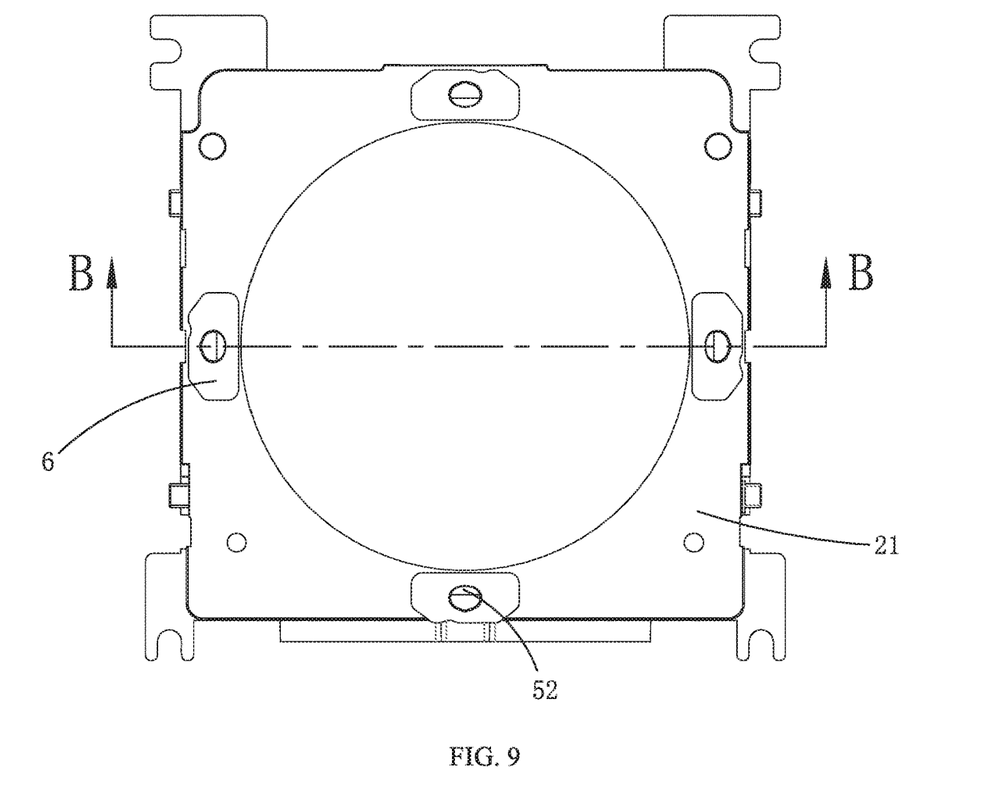
FIG. 9 is a schematic three-dimensional structural view showing a flapper and a bottom match according to Embodiment Two of the present disclosure.

With reference to FIGS. 2-3, the base 1 further includes a circuit board 8, and the circuit board 8 is fixed to the substrate 11 at the side facing the lens base 2. A conductive member 7 contacts the circuit board 8, thereby realizing electrical connection. There is a gap between the flapper 6 and the circuit board 8. The circuit board 8 is connected with an external power supply to supply power to the conductive member 7 and the holding assembly 3. The conductive member 7 may transmit current to the shape memory alloy wires 4 that shrink and are deformed due to electricity, driving the lens base 2 to move in the direction perpendicular to the optical axis, thereby realizing the image stabilization function of a lens driving device.

With reference to FIGS. 3-6, the lens base 2 includes a bottom 21 and a lens holder 22 installed on the bottom 21. The fixing member 5 is disposed on the bottom 21 at the side facing the substrate 11. Preferably, the bottom 21 is square. Each side of the bottom 21 is provided with a fixing member 5 which forms a "V" with a line defined by the two fixing grooves 122 on the corresponding side plate 121. Correspondingly, the shape memory alloy wires 4 are a "V". It may be appreciated that the shape memory alloy wires 4 may be of other shapes based on the number of fixing members 5 and how the shape memory alloy wires 4 are fixed.

With reference to FIGS. 5-8, the fixing member 5 includes a body 51 extending from the bottom 21 towards the substrate 11, and a protruding pillar 52 disposed on the body 51. One side of the body 51 is provided with an attaching surface 511 attached to the drive end 42. The flapper 6 includes an installation section 61 installed to the fixing member 5, and a shielding section 62 extending from the installation section 61 towards the optical axis of the lens and beyond the attaching surface 511. Either one of the fixing member 5 and the installation section 61 is provided with a clipping hole 63, the other one of the fixing member 5 and the installation section 61 is provided with a protruding pillar 52, and the flapper 6 is installed to the fixing member 5 by engaging the protruding pillar 52 with the clipping hole 63. In an embodiment, the protruding pillar 52 is disposed on the fixing member 5. The installation section 61 of the flapper 6 is provided with the clipping hole 63. The flapper 6 is installed to the fixing member 5 by engaging the protruding pillar 52 with the clipping hole 63. It is certain that alternatively, the clipping hole 63 may be disposed on the fixing member 5 and the installation section 61 of the flapper 6 may be provided with the protruding pillar 52. There may be distance between the fixing surface 521 of the protruding pillar 52 (the fixing surface 521 being away from the end 41) and the attaching surface 511, or they may be aligned. In this embodiment, there is no distance in between. In an embodiment, the flapper 6 is a semicircle and has an arc side surface 64 located at a side of a central axis of the fixing member 5, the side being away from the end 41. The installation section 61 and the shielding section 62 are integrally formed. The installation section 61 is fixed to the fixing member 5. The shielding section 62 is disposed at one side of the installation section 61, the side corresponding to the attaching surface 511, and the shielding section 62 goes beyond the attaching surface 511 in a direction perpendicular to the optical axis. As a result, an accommodating recess is formed by the attaching surface 511, the shielding section 62 and the bottom 21, and is configured to accommodate the drive end 42 of the shape memory alloy wires 4. In an embodiment, the fixing member 5 includes the body 51 which is a semi-cylinder, and the drive end 42 of the shape memory alloy wires 4 is attached to the arc attaching surface 511 of the semi-cylinder body 51. As a result, the shape memory alloy wires 4 may be prevented from being damaged by an edge or corner, thereby prolonging service life of the shape memory alloy wires 4. The shielding section 62 is installed at a side of the installation section 61, the side corresponding to the arc attaching surface 511, which may effectively prevent the shape memory alloy wires 4 from escaping the fixing member 5 in a direction parallel to the optical axis. Further, when shape memory alloy wires 4 at one side operates, no greater stress may be caused to the shape memory alloy wires 4 at other sides due to strengthened fixing of the drive end 42.

Preferably, an angle α is provided between the shielding section 62 and the attaching surface 511, where 0°<α≤90°. In an embodiment, the angle α is 90°.

Preferably, each group of shape memory alloy wires 4 includes a plurality of shape memory alloy wires 4. In an embodiment, each group includes four shape memory alloy wires 4, and the ends 41 of which are soldered together correspondingly. It may be appreciated that the number of the shape memory alloy wires 4 in each group may be adjusted in accordance with a weight of a driven assembly and characteristics of the shape memory alloy wires 4.

Figure 1:
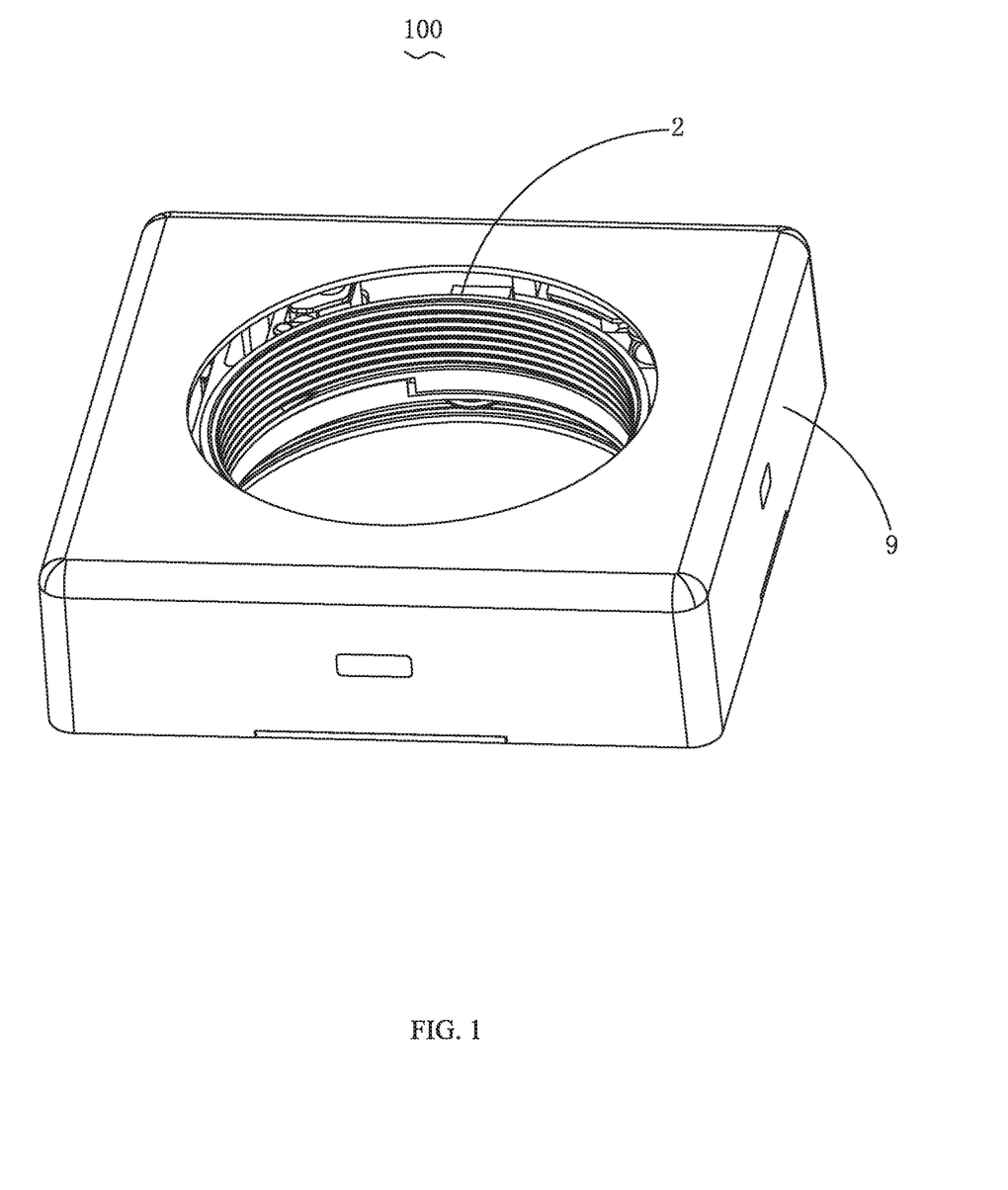
FIG. 1 is a schematic three-dimensional structural view of a lens module according to Embodiment One of the present disclosure.

With reference to FIGS. 1-3, the lens module 100 further includes a housing 9 that includes a top wall and multiple side walls. The housing is capped on the base 1. An end (away from the bottom) of the four side plates 121 of the frame 12 contacts the top wall of the housing 9, thereby holding the housing 9. The housing 9 is configured to provide protection to and prevent proof dust for the entire lens module 100, thereby preventing dust from entering the lens module 100 and preventing components within the housing from being damaged.

Embodiment Two

With reference to FIGS. 9-14, this embodiment differs from Embodiment One in the shape of the flapper 6 and the structure of the fixing member 5. In this embodiment, the flapper 6 is of a strip which may either be a rectangle or approximately be a rectangle. Specifically, a part of the flapper 6 at the side of the central axis of the fixing member 5, the side being away from the end 41, is rectangular. The flapper 6 has a long side surface 65 located at the side of the central axis of the fixing member 5, the side being away from the end 41, and two short side surfaces 66 respectively extending from two ends 41 of the long side surface 65 to the side where the end 41 locates. The long side surface 65 and the two short side surfaces 66 are provided alternately. The length of the long side surface is defined as L and a distance between the two ends 41 of a shape memory alloy wire is defined as D (not shown), where L/D≥1/5. By increasing the length of the long side surface 65 and the area of the shielding section 62 of the flapper 6, the effect that the flapper 6 prevents the shape memory alloy wires 4 from escaping the fixing member 5 is further strengthened.

Figure 10:
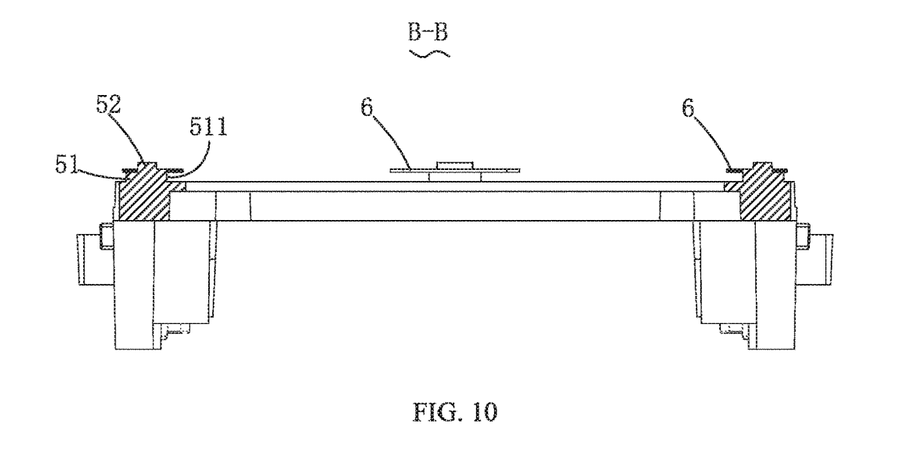
FIG. 10 is a sectional view of B-B in FIG. 9.
Figure 11:
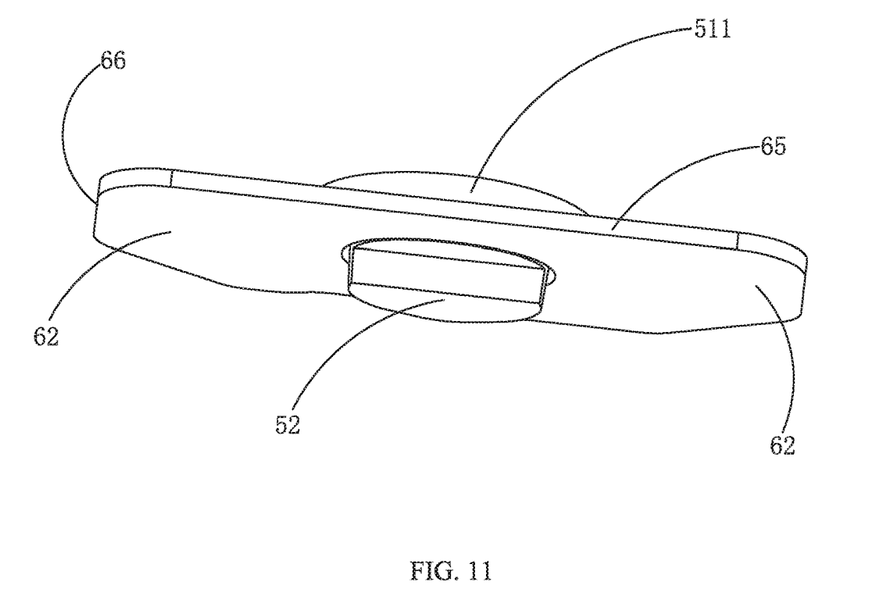
FIG. 11 is a schematic three-dimensional structural view showing the flapper and a fixing member match according to Embodiment Two of the present disclosure.
Figure 12:
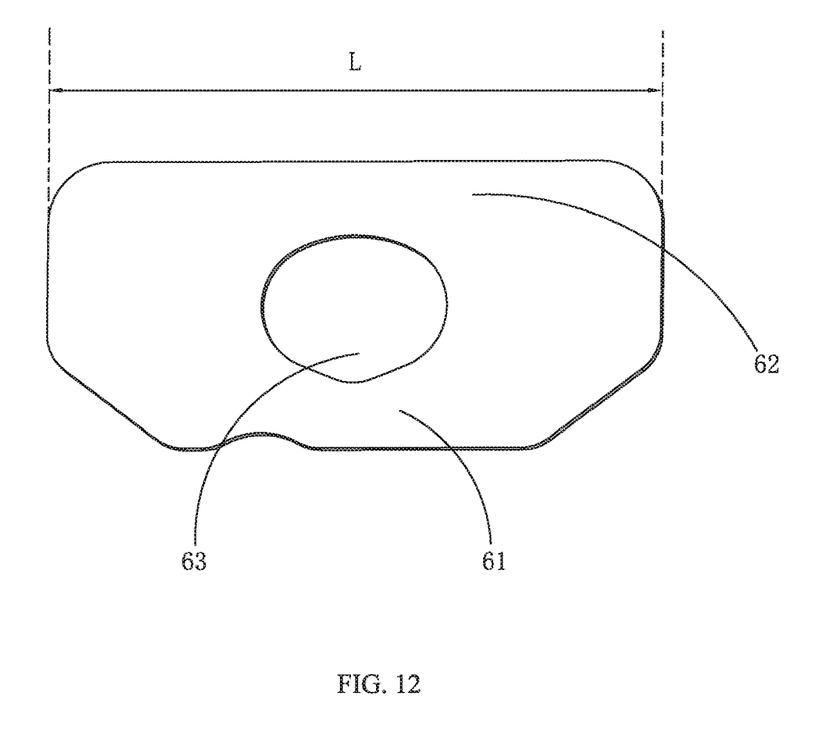
FIG. 12 is a schematic three-dimensional structural view of the flapper according to Embodiment Two of the present disclosure.
Figure 13:
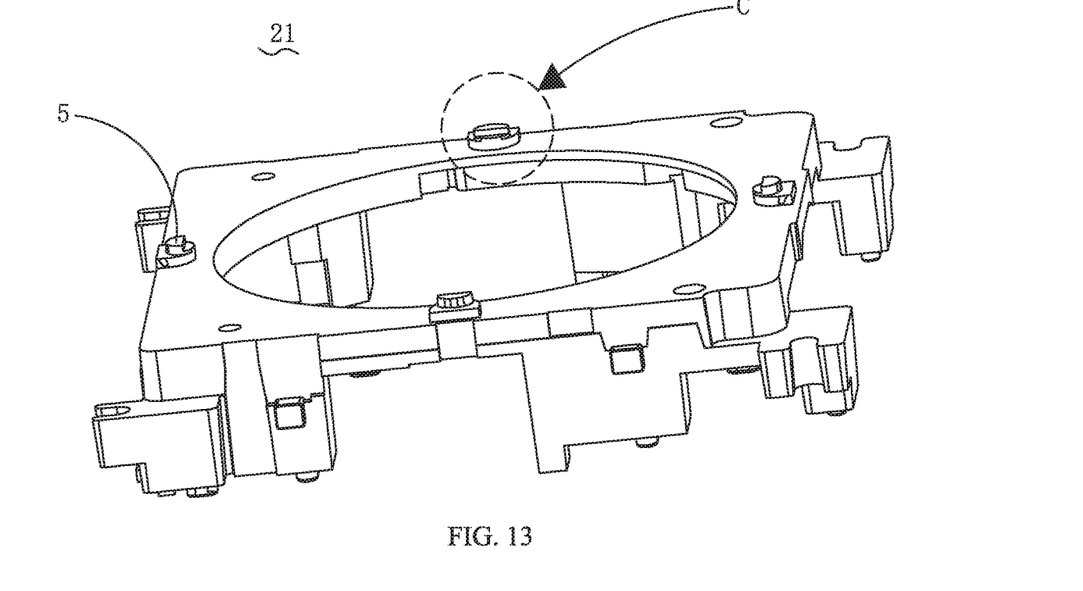
FIG. 13 is a schematic three-dimensional structural view of the bottom according to Embodiment Two of the present disclosure.
Figure 14:
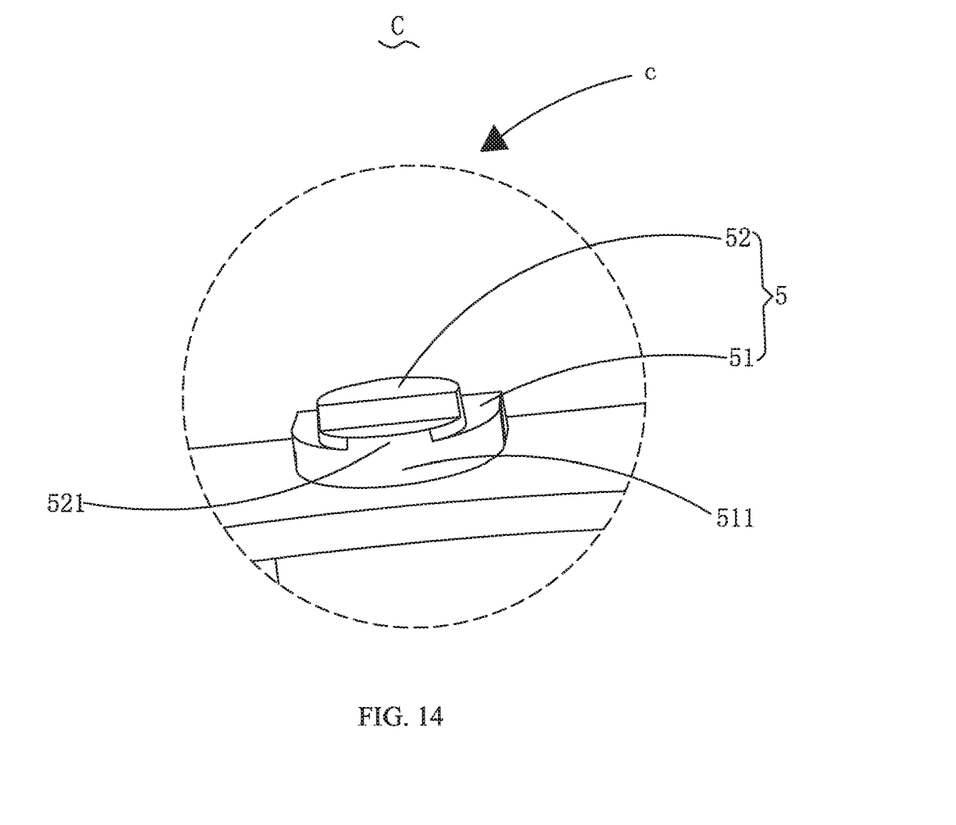
FIG. 14 is a schematic zoomed-in view of C in FIG. 12.

With reference to FIG. 10 and FIGS. 13-14, a fixing surface 521 of the protruding pillar 52, the fixing surface 521 being away from the end 41, is set aligned with the attaching surface 511, and the protruding pillar 52 and the body 51 of the fixing member 5 are integrally formed. By setting the fixing surface 521 and the attaching surface 511 as aligned and as integrally formed, after the flapper 6 is installed in the fixing member 5, there is no gap between the flapper 6 and the body 51 of the fixing member 5 in the direction perpendicular to the direction of optical axis of the lens. As a result, the shape memory alloy wires 4 are prevented from sliding into the gap, thereby improving accuracy of image stabilization of the lens module 100.

The above are only embodiments of the present disclosure. It shall be noted that those of ordinary skill in the art can make improvements without departing from the creative concept of the present disclosure, and these belong to the protection scope of the present disclosure.

What is claimed is:

1. A lens module, comprising a base, a lens base, a holding assembly configured to hold the lens base, and several groups of shape memory alloy wires configured to drive the lens base to move in a direction perpendicular to a direction of an optical axis of a lens; the lens base being suspended within the base by the holding assembly; each group of the shape memory alloy wires comprising two ends fixed to one of the base and the lens base, and a drive end located between the two ends; the other one of the base and the lens base being provided with a fixing member, the drive end being connected to the fixing member, and the fixing member being provided with a flapper configured to prevent the drive end from escaping the fixing member.

2. The lens module according to claim 1, wherein, the fixing member comprising an attaching surface attaching to the drive end, and the flapper comprising an installation section installed to the fixing member and a shielding section extending from the installation section and beyond the attaching surface.

3. The lens module according to claim 2, wherein, the installation section and the shielding section are integrally formed.

4. The lens module according to claim 2, wherein, an angle α is provided between the shielding section and the attaching surface, where 0°<α≤90°.

5. The lens module according to claim 2, wherein, the attaching surface being an arc surface.

6. The lens module according to claim 2, wherein, the flapper is a semicircle and has an arc side surface located at a side of a central axis of the fixing member, the side being away from the end; alternatively, a part of the flapper located at the side of the central axis of the fixing member, the side being away from the end, is rectangular, the flapper has a long side surface located at the side of the central axis of the fixing member, the side being away from the end, and two short side surfaces respectively extending from two ends of the long side surface to the side where the end locates, the long side surface and the two short side surfaces being provided alternately, and the length of the long side surface being defined as L and a distance between the two ends of a shape memory alloy wire being defined as D, where $L/D \geq 1/5$.

7. The lens module according to claim 2, wherein, either one of the fixing member and the installation section is provided with a clipping hole, the other one of the fixing member and the installation section is provided with a protruding pillar, and the flapper being installed to the fixing member by engaging the protruding pillar with the clipping hole.

8. The lens module according to claim 7, wherein, the protruding pillar is provided on the fixing member, a fixing surface of the protruding pillar, the fixing surface being away from the end, is set aligned with the attaching surface; the fixing member further comprises a body, and the protruding pillar and the body are integrally formed.

9. The lens module according to claim 8, wherein, the end of the shape memory alloy wire is fixed to the base; the base comprises a substrate and a frame fixed to the substrate, and the substrate and the frame form an accommodating space configured to accommodate the lens base; the frame is rectangular, and comprises four side plates disposed circumferentially, the end of the shape memory alloy wire being fixed to one end of the side plate, the end facing the substrate; the fixing member is installed on the lens base, the body extends from the lens base towards the substrate, and the attaching surface is provided at a side of the body.

10. The lens module according to claim 9, wherein, two fixing grooves are provided at an end of each of the side plates, the end facing the substrate; the lens module further comprises a plurality of conductive members, each conductive member is fixed in one respective fixing groove, and the two ends of each group of the shape memory alloy wires are respectively fixed to two of the conductive members of the same side plate; the base further comprises a circuit board, the circuit board is fixed to the substrate at the side facing the lens base; the conductive member is electrically connected with the circuit board, and there is a gap between the flapper and the circuit board.

* * * * *